United States Patent [19]

Shuman

[11] 3,860,628

[45] Jan. 14, 1975

[54] CYANOMETHYL(3-TRIFLUOROMETHYLPHENOXY)(4-CHLOROPHENYL)ACETATE

[75] Inventor: Richard F. Shuman, Westfield, N.J.

[73] Assignee: Merck & Co., Inc., Rahway, N.J.

[22] Filed: July 13, 1972

[21] Appl. No.: 271,447

[52] U.S. Cl. .... 260/465 D, 260/465 B, 260/473 IG, 260/544 M, 260/999
[51] Int. Cl. .......................................... C07c 121/74
[58] Field of Search ................................ 260/465 D

[56] References Cited
UNITED STATES PATENTS
3,517,051  6/1970  Bolhofer ......................... 260/465 X Primary Examiner—Lewis Gotts
Assistant Examiner—Dolph H. Torrence
Attorney, Agent, or Firm—Edmunde D. Riedl; J. Jerome Behan

[57] ABSTRACT

A method for the preparation of 2-acetamidoethyl(3-trifluoromethylphenoxy)(4-chlorophenyl)acetate which comprises treating 2-aminoethyl (3-trifluoromethylphenoxy)-(4-chlorophenyl)acetate with an acetylating agent. The 2-acetamidoethyl(3-trifluoromethylphenoxy)(4-chlorophenyl)-acetate thus obtained is a hypocholesterolemic and hypolipemic agent which effectively reduces the concentration of cholesterol, triglycerides and other lipids in blood serum.

1 Claim, No Drawings

CYANOMETHYL(3-TRIFLUOROMETHYLPHENOXY)(4-CHLOROPHENYL)ACETATE

This invention relates to a novel method for the preparation of 2-acetamidoethyl (3-trifluoromethylphenoxy)-(4-chlorophenyl)acetate.

There is no clear agreement about the actual role of cholesterol and triglycerides in the localization of atherosclerotic plaques but numerous studies support the concept that cholesterol and triglycerides play a major role in the pathogenesis of atherosclerosis because along with other lipids and fibrin they accumulate in the arterial intima and subintima and produce arterial corrosion.

It is the purpose of this invention to describe a novel method for the preparation of 2-acetamidoethyl (3-trifluoromethylphenoxy) (4-chlorophenyl)acetate which product has proved effective in reducing the concentration of cholesterol, triglycerides and other lipids in blood serum. This compound induces a significant reduction in cholesterol and triglyceride levels in serum and it achieves this result with little or no irritation to the gastrointestinal tract.

According to this invention the preparation of 2-acetamidoethyl (3-trifluoromethylphenoxy) (4-chlorophenyl)-acetate is obtained by treating 2-aminoethyl (3-trifluoromethylphenoxy) (4-chlorophenyl)acetate or its acid addition salt with an acetylating agent, for example, acetic anhydride, acetyl chloride, ketene, N-acetylimidazole and the like. The reaction may be conducted at a temperature in the range of from about $-20°C.$ to about $100°C.$ The choice of a solvent is not critical to the reaction and, in general, the process may be conducted in any suitably inert solvent in which the reactants are soluble such as acetic acid, benzene and the like. However, acetic acid is the preferred solvent. When the acid addition salt is employed, removal of the acid is effected by treatment with a weak base such as potassium carbonate and the like. The following equation illustrates this method of preparation employing acetic anhydride; however, it is to be understood that other acetylating agents capable of affording the acetyl radical may also be employed in a similar process to afford the identical product (I):

2-Acetamidoethyl (3-trifluoromethylphenoxy)-(4-chlorophenyl)acetate is a crystalline solid which can be purified by recrystallization from a single solvent or from a mixture of solvents, for example, by recrystallization from a lower alkanol such as methanol, ethanol, isopropanol and the like or from a mixture of these lower alkanols. Also, the product may be recrystallized from a mixture of toluene and hexane.

The 2-aminoethyl (3-trifluoromethylphenoxy) (4-chlorophenyl)acetate (II) or its acid addition salt may be prepared by either of two alternate processes. The first process comprises treating an N-acyl substituted 2-aminoethyl (3-trifluoromethylphenoxy) (4-chlorophenyl)acetate with a reducing agent, for example, a strong organic acid. The second method comprises the hydrogenation of cyanomethyl (3-trifluoromethylphenoxy) (4-chlorophenyl)acetate in the presence of a metal catalyst such as palladium and the like.

The first of the above-mentioned procedures for preparing the 2-aminoethyl (3-trifluoromethylphenoxy) (4-chlorphenyl)acetate comprises treating an N-acyl substituted 2-aminoethyl (3-trifluoromethylphenoxy) (4-chlorophenyl)-acetate with an acid, preferably, a strong organic acid such as trifluoroacetic, hydrofluoric, hydrochloric, hydrobromic, sulfuric, p-toluenesulfonic and the like. This reaction may be conducted at a temperature in the range of from about $-20°C.$ to about $70°C.$ for a period of time of from about 0.5 hours to about 5 hours. While the particular solvent employed is not critical, it has been found convenient to employ as the solvent an excess of the particular acid which is used in the reaction. The following equation illustrates this process:

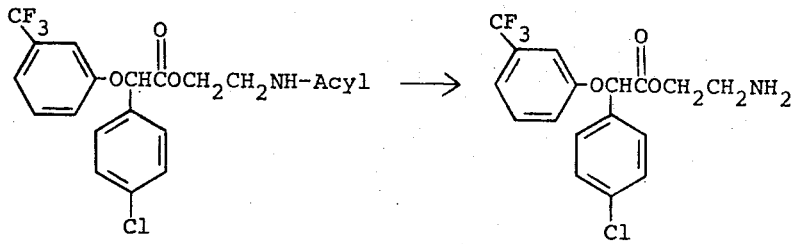

wherein the acyl radical is a mononuclear aralkoxycarbonyl radical, for example, an unsubstituted or substituted phenyl lower alkoxycarbonyl wherein the substituent is methoxy, chloro or nitro such as benzyloxycarbonyl, 4-methoxybenzyloxycarbonyl, 2-methoxybenzyloxycarbonyl, 2,4-dimethoxybenzyloxycarbonyl, 4-chlorobenzyloxycarbonyl, 4-nitrobenzyloxycarbonyl and the like.

The second method for preparing the 2-aminoethyl (3-trifluoromethylphenoxy) (4-chlorophenyl)acetate comprises the catalytic hydrogenation of cyanomethyl (3-trifluoromethylphenoxy) (4-chlorophenyl)acetate

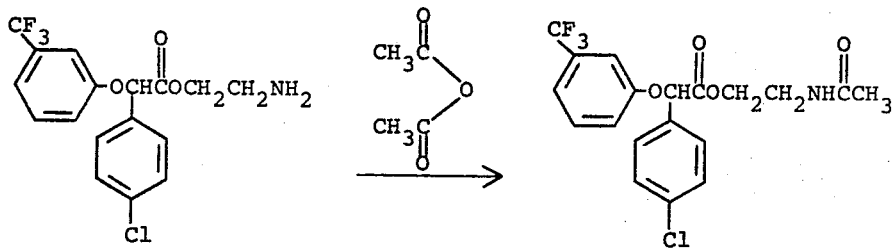

employing as the catalyst a metal catalyst such as palladium and the like with hydrogen under pressure. For the purposes of isolation it has been found convenient to employ as the solvent an organic acid which will form an acid addition salt of the desired aminoethyl compound. Acids which may be employed include the organic acids, for example, trifluoroacetic acid, acetic acid or strong acids in aprotic solvents, particularly ethers, for example, trifluoroacetic acid, methanesulfonic acid, hydrogen chloride, trichloroacetic acid, benzenesulfonic acid, p-toluenesulfonic acid, p-nitrobenzenesulfonic acids in diethyl ether, tetrahydrofuran, dioxane, dimethoxyethane, diglyme or triglyme; also, aromatic solvents such as benzene, toluene, xylene and the like. The following equation illustrates this process:

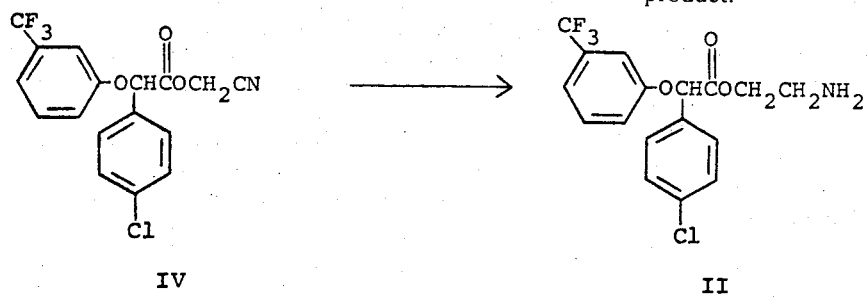

IV → II

The N-acyl 2-aminoethyl (3-trifluoromethylphenoxy)-(4-chlorophenyl)acetate is prepared by treating (3-trifluoromethylphenoxy) (4-chlorophenyl)acetyl chloride with N-acyl-2-aminoethanol. This reaction may be conducted at a temperature in the range of from about −20°C. to about 100°C.; however, in general, the reaction is conveniently conducted at ambient temperature. Any solvent which is inert or substantially inert to the reactants may be employed such as benzene and the like. It has been found convenient to add to the reaction mixture a base such as pyridine and the like to react with any hydrochloric acid formed during the reaction. The following equation illustrates this process:

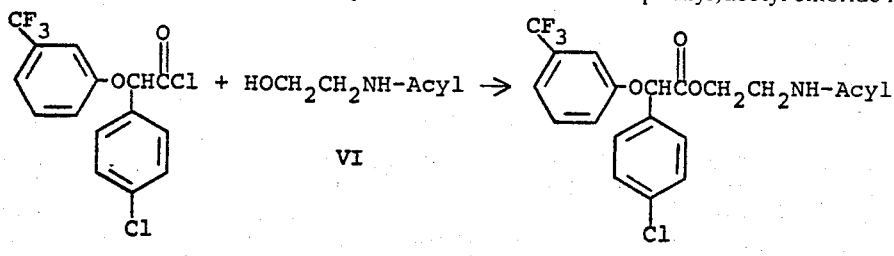

V + VI → III wherein acyl is as defined above.

Cyanomethyl (3-trifluoromethylphenoxy) (4-chlorophenyl)acetate (IV) prepared by treating (3-trifluoromethylphenoxy) (4-chlorophenyl)acetyl chloride (V) with formaldehyde cyanohydrin in a suitably inert solvent or mixture of inert solvents such as benzene-ether and the like.

The N-acyl-2-aminoethanols (VI) employed in the preparation of N-acyl-2-aminoethyl (3-trifluoromethylphenoxy) (4-chlorophenyl)acetate (III) are either known compounds or may be prepared by treating 2-aminoethanol with a compound of the formula: Acyl-X, wherein Acyl is as defined above and X is halo such as chloro and the like in the presence of a base such as sodium hydroxide and the like.

Due to the unstability of some of the Acyl-X compounds, especially those with methoxy substituents, it is necessary to prepare them fresh before each reaction. This reaction comprises treating a mononuclear aralkanol, for example, an unsubstituted or substituted phenyl lower alkanol wherein the substituent is methoxy, chloro or nitro, with phosgene in an inert solvent such as diethyl ether at 0°C.

The following examples illustrate the process of this invention. However, the examples are illustrative only and this invention should not be construed as being limited thereto since other reaction conditions and other functionally equivalent reagents may be substituted therefor to afford an identical 2-acetamidoethyl (3-trifluoromethylphenoxy) (4-chlorophenyl)acetate product.

EXAMPLE 1

2-Acetamidoethyl (3-trifluoromethylphenoxy) (4-chlorophenyl)-acetate

Step A

N-(Benzyloxycarbonyl)-2-aminoethyl (3-trifluoromethylphenoxy) (4-chlorophenyl)-acetate (3-Trifluoromethylphenoxy) (4-chlorophenyl)acetic acid (8.47 g., 0.0256 mole) is refluxed for two hours with thionyl chloride (13.1 g., 0.11 mole). The excess thionyl chloride is removed under vacuum at 80°–90°C. The residue of (3-trifluoromethylphenoxy) (4-chlorophenyl)acetyl chloride is cooled to 25°C. and dissolved in benzene (10 ml.). This solution is added over a five-minute period to N-(benzyloxycarbonyl)-2-aminoethanol (5g., 0.0256 mole), pyridine (2.43 g., 0.0307 mole) and benzene (50 ml.). The reaction mixture is stirred for one hour at 25°–30°C. Ether (25 ml.) is added and the mixture is extracted successively with water (25 ml.), sodium bicarbonate (2 × 25 ml., 10%) and water (50 ml.). The ether-benzene solution is dried over sodium sulfate, filtered and the ether removed to afford 12.5 g. (99.7% yield) of N-(benzyloxycarbonyl)-2-aminoethyl (3-trifluoromethylphenoxy)-(4-chlorophenyl)acetate.

Elemental analysis for $C_{25}H_{21}ClF_3NO_5$:
Calc.: C, 59.12; H, 4.17; Cl, 6.98; F, 11.22; N, 2.76;
Found: C, 59.18; H, 4.18; Cl, 6.98; F, 10.95; N, 2.75.

By substituting for the N-(benzyloxycarbonyl)-2-aminoethanol employed in Step A an equimolar quantity of N-(4-methoxybenzylcarbonyl)-2-aminoethanol, N-(2-methoxybenzyloxycarbonyl)-2-aminoethanol, N-(2,4-dimethoxybenzyloxycarbonyl)-2-aminoethanol, N-(4-chlorobenzyloxycarbonyl)-2-aminoethanol and N-(4-nitrobenzyloxycarbonyl)-2-aminoethanol and following substantially the procedure described therein there is prepared, respectively, N-(4-methoxybenzylcarbonyl)-2-aminoethyl (3-trifluoromethylphenoxy) (4-chlorophenyl)acetate, N-(2-methoxybenzyloxycarbonyl)-2-aminoethyl (3-trifluoromethylphenoxy) (4-chlorophenyl)acetate, N-(2,4-dimethoxybenzyloxycarbonyl)-2-aminoethyl (3-trifluoromethylphenoxy)-(4-chlorophenyl)acetate, N-(4-chlorobenzyloxycarbonyl)-2-aminoethyl (3-trifluoromethylphenoxy) (4-chlorophenyl)acetate and N-(4-nitrobenzyloxycarbonyl)-2-aminoethyl (3-trifluoromethylphenoxy) (4-chlorophenyl)acetate.

Step B

2-Aminoethyl (3-trifluoromethylphenoxy)-(4-chlorophenyl)acetate, trifluoroacetic Acid N-(benzyloxycarbonyl)-2-aminoethyl (3-trifluouromethylphenoxy) (4-chlorophenyl)acetate (6.04 g., 0.0119 mole) is dissolved in trifluoroacetic acid and heated at 60°C. for 1.3 hours. The excess trifluoroacetic acid is removed under vacuum at 60°C. The residue is transferred to a separatory funnel and shaken with 3 × 25 ml. of hexane, decanting the supernatant layer each time. The resulting viscous product is dried under vacuum at 40°–50°C. to afford 5.78 g. of crude product. A portion of this crude product (2.2 g.) is triturated with carbon tetrachloride (13 ml.) to afford 1.27 g. of substantially pure 2-aminoethyl (3-trifluoromethylphenoxy)-(4-chlorophenyl)acetate, trifluoroacetic acid, m.p. 105°–111°C.

Elemental analysis for $C_{19}H_{16}ClF_6NO_5$:

Calc.: C, 46.78; H, 3.31; Cl, 7.27; F, 23,37; N, 2.87;
Found: C, 45.58; H, 3.38; Cl, 7.20; F, 23.37; N, 3.26.

By substituting for the N-(benzyloxycarbonyl)-2-aminoethyl (3-trifluoromethylphenoxy) (4-chlorophenyl)acetate employed in Step B an equimolar quantity of N-(4-methoxybenzylcarbonyl)-2-aminoethyl (3-trifluoromethylphenoxy) (4-chlorophenyl)acetate, N-(2-methoxybenzyloxycarbonyl)-2-aminoethyl (3-trifluoromethylphenoxy) (4-chlorophenyl)acetate, N-(2,4-dimethoxybenzyloxycarbonyl)-2-aminoethyl (3-trifluoromethylphenoxy) (4-chlorophenyl)acetate, N-(4-chlorobenzyloxycarbonyl)-2-aminoethyl (3-trifluoromethylphenoxy) (4-chlorophenyl)acetate and N-(4-nitrobenzyloxycarbonyl)-2-aminoethyl (3-trifluoromethylphenoxy) (4-chlorophenyl)acetate and by following substantially the procedure described therein, there is obtained 2-aminoethyl (3-trifluoromethylphenoxy) (4-chlorophenyl)acetate, trifluoroacetic acid.

Step C

2-Acetamidoethyl (3-trifluoromethylphenoxy) (4-chlorophenyl)acetate

2-Aminoethyl (3-trifluoromethylphenoxy) (4-chlorophenyl)acetate, trifluoroacetic acid (3 g., 0.00615 mole) is added to a solution of anhydrous sodium acetate (1.48 g., 0.018 mole) in acetic acid (10 ml.) and acetic anhydride (15 ml.). The solution is stirred for four hours at 25°C. The acetic anhydride and acetic acid are removed under vacuum at 90°C. The residue is dissolved in ether and the ether solution is washed successively with water (30 ml.), potassium carbonate (30 ml., 10%) and with 10% sodium solution (30 ml.). The ether layer is dried over sodium sulfate, filtered and the ether removed to afford the crude product which is dissolved in toluene (4 ml.) to which is added hexane (6 ml.). The product is collected and dried to afford 1.35 g. of substantially pure 2-acetamidoethyl (3-trifluoromethylphenoxy) (4-chlorophenyl)acetate, m.p. 85°–88°C.

Elemental analysis for $C_{19}H_{17}ClF_3N$:

Calc.: C, 54.88; H, 4.12; Cl, 8.53; F, 13.71; N, 3.37;
Found: C, 54.63; H, 4.09; Cl, 8.58; F, 13.50; N, 3.25.

The 2-acetamidoethyl (3-trifluoromethylphenoxy) (4-chlorophenyl)acetate may be further recrystallized from isopropanol to afford the product with a melting point of 93.5°–95.5°C.

By substituting for the acetic anhydride employed in Step C, an equimolar quantity of acetyl chloride, ketene or N-acetyl imidazole 2-aminoethyl (3-trifluoromethylphenoxy)(4-chlorophenyl)acetate may be similarly acetylated to afford the 2-acetamidoethyl (3-trifluoromethylphenoxy)(4-chlorophenyl)-acetate.

EXAMPLE 2

2-Acetamidoethyl (3-trifluoromethylphenoxy) (4-chlorophenyl)-acetate

Step A

Cyanomethyl (3-trifluoromethylphenoxy)-(4-chlorophenyl)acetate

To a solution of (3-trifluoromethylphenoxy) (4-chlorophenyl)acetyl chloride (0.0256 mole) in anhydrous benzene (30 ml.) is added sodium carbonate (0.05 mole) which had been dried under vacuum for 18 hours at 120°C. To this mixture is added formaldehyde cyanohydrin (0.0256 mole) in ether (20 ml.) and the solution stirred for two hours at 25°C. The reaction mixture is filtered to remove the inorganic salts and the benzene-ether solution of cyanomethyl (3-trifluoromethylphenoxy) (4-chlorophenyl)acetate is used in the next step without further purification.

Step B

2-Aminoethyl (3-trifluoromethylphenoxy) (4-chlorophenyl)acetate, trifluoroacetic Acid To the benzene-ether solution of cyanomethyl (3-trifluoromethylphenoxy) (4-chlorophenyl)acetate from Step A is added trifluoroacetic acid (2.92 g., 0.0256 mole) and 10% palladium-on-carbon (1.0 g.). The reaction mixture is placed under 45 p.s.i. of hydrogen for three hours with shaking. The catalyst is removed by filtration and the solvents removed under vacuum to afford crude product which is triturated with carbon tetrachloride (20 ml.) to afford substantially pure 2-aminoethyl (3-trifluoromethylphenoxy) (4-chlorophenyl)acetate, trifluoroacetic acid, m.p. 105°–111°C.

Step C

2-Acetamidoethyl (3-trifluoromethylphenoxy)-(4-chlorophenyl)acetate

By following substantially the procedure described in Example 1, Step C, 2-aminoethyl (3- trifluoromethylphenoxy)-(4-chlorophenyl)acetate, trifluoroacetic acid may be converted to 2-acetamidoethyl (3-trifluoromethylphenoxy)(4-chlorophenyl)acetate.

PREPARATION OF STARTING MATERIALS

A. N-Acyl-2-aminoethanols

N-(Benzyloxycarbonyl)-2-aminoethanol

2-Aminoethanol (6.1 g., 0.1 mole) is dissolved in 50 ml. of sodium hydroxide (2N, 0.1 mole) and the solution is cooled to 5°C. To this solution is added benzylchloroformate (16.0 g., 0.0942 mole) dropwise over a 15-minute period. An additional 25 ml. of sodium hydroxide (2N, 0.05 mole) is added when half of the benzylchloroformate has been added. The reaction mixture is stirred for ½ hour at 0°C. The white solids are collected and washed with cold water. The product is dissolved in ether (50 ml.) and the ether solution is washed successively with water (2 × 50 ml.), hydrochloric acid (2N, 2 × 50 ml.) and water (2 × 50 ml.). The ether solution is dried over sodium sulfate, filtered and the ether removed under vacuum to afford 11.0 g. (60%) of N-(benzyloxycarbonyl)-2-aminoethanol. The product is crystallized from diisopropyl ether (40 ml.) at −20° C. The product is collected and washed with an ice cold mixture of petroleum ether in diethyl ether (4:1, 30 ml.) to afford 6.13 g. of N-(benzyloxycarbonyl)-2-aminoethanol, m.p. 45°–50°C.

By following substantially the procedure described above and by substituting for the benzylchloroformate an equimolar quantity of 4-methoxybenzylchloroformate, 2-methoxybenzylchloroformate, 2,4-dimethoxybenzylchloroformate, 4-chlorobenzylchloroformate and 4-nitrobenzylchloroformate there is produced, respectively, N-(4-methoxybenzylcarbonyl)-2-aminoethanol, N-(2-methoxybenzyloxycarbonyl)-2-aminoethanol, N-(2,4-dimethoxybenzyloxycarbonyl)-2-aminoethanol, N-(4-chlorobenzyloxycarbonyl)-2-aminoethanol and N-(4-nitrobenzyloxycarbonyl)-2-aminoethanol.

B. Acyl-X Compounds

4-Methoxybenzylchloroformate

To a solution of phosgene (28.0 ml., 0.406 mole) in diethyl ether (200 ml.) at 0°C. under a nitrogen atmosphere is added dropwise 4-methoxybenzyl alcohol (27.6 g., 0.2 mole) in diethyl ether (140 ml.) over a 1 ½ hour period. The ether is removed under vacuum to afford 4-methoxybenzylchloroformate which is used immediately.

By substituting for the 4-methoxybenzyl alcohol an equimolar quantity of 2-methoxybenzyl alcohol, 2,4-dimethoxybenzyl alcohol, 4-chlorobenzyl alcohol and 2-nitrobenzyl alcohol there is obtained, respectively, 2-methoxybenzylchloroformate, 2,4-dimethoxybenzylchloroformate, 4-chlorobenzylchloroformate and 4-nitrobenzylchloroformate.

I claim:

1. Cyanomethyl (3-trifluoromethylphenoxy) (4-chlorophenyl)acetate.

* * * * *